United States Patent [19]
Doane et al.

[11] Patent Number: 5,384,067
[45] Date of Patent: Jan. 24, 1995

[54] GREY SCALE LIQUID CRYSTAL MATERIAL

[75] Inventors: J. William Doane; Deng K. Yang, both of Kent, Ohio

[73] Assignee: Kent State University, Kent, Ohio

[21] Appl. No.: 885,154

[22] Filed: May 18, 1992

Related U.S. Application Data

[63] Continuation-in-part of Ser. No. 694,840, May 2, 1991, abandoned.

[51] Int. Cl.⁶ .................... C09K 19/52; G02F 1/13
[52] U.S. Cl. .................... 252/299.01; 428/1; 359/51; 359/91
[58] Field of Search ............ 252/299.01, 582; 359/51, 52, 91; 428/1

[56] References Cited

U.S. PATENT DOCUMENTS

| | | | |
|---|---|---|---|
| 3,600,060 | 8/1971 | Kettering | 252/299.01 |
| 3,645,604 | 2/1972 | Ngo | 359/53 |
| 3,756,694 | 9/1973 | Soree et al. | 359/103 |
| 3,821,720 | 6/1974 | Greubel et al. | 365/108 |
| 3,871,904 | 3/1975 | Haas et al. | 252/299.01 |
| 3,872,050 | 3/1975 | Benton | 252/299.01 |
| 3,957,346 | 5/1976 | Saeva | 359/37 |
| 4,017,156 | 4/1977 | Moriyama et al. | 359/53 |
| 4,087,575 | 5/1978 | Bichara | 428/1 |
| 4,097,127 | 6/1978 | Haas et al. | 359/91 |
| 4,447,132 | 5/1984 | de Zwart | 252/299.01 |
| 4,664,483 | 3/1972 | Van Sprang et al. | 252/299.01 |
| 4,693,560 | 9/1987 | Wiley | 359/50 |
| 4,699,468 | 10/1987 | Harasim et al. | 359/49 |
| 4,842,380 | 7/1989 | Takayanagi et al. | 252/299.01 |
| 4,890,902 | 1/1990 | Doane et al. | 359/51 |
| 4,994,204 | 2/1991 | Doane et al. | 252/299.01 |

FOREIGN PATENT DOCUMENTS

| | | |
|---|---|---|
| 0313053 | 4/1989 | European Pat. Off. . |
| 0376370 | 7/1990 | European Pat. Off. . |
| 0451905 | 3/1991 | European Pat. Off. . |
| 0423881 | 4/1991 | European Pat. Off. . |

OTHER PUBLICATIONS

Gray, *Chimia*, vol. 34, pp. 45–58.
Proceedings of the S.I.D., vol. 13/2, Second Quarter (1972).
Shimomura et al., *Applied Optics*, 19(24), pp. 4206–4209 (1980).
Mariani et al., *Liquid Crystals*, 1(4), pp. 327–336 (1986).
Hikmet, *Electrically Induced Light Scattering from Anisotropic Gels*, J. Appl. Phys. 68(9), pp. 4406–4412 (1990).
Heilmeier, *A New Electric Field Controlled Reflective Optical Storage Effect* . . . , Proc. IEEE, 57(1), pp. 34–38 (1969).
Jiang et al., *Chemistry Express*, vol. 6, No. 12, pp. 1005–1008, (1991).

*Primary Examiner*—Philip Tucker

[57] ABSTRACT

A method of selectively adjusting the intensity of reflection to obtain stable grey scale reflectance of colored light from a light modulating chiral nematic liquid crystal material is disclosed. The method comprises subjecting the material to an electric field pulse of sufficient duration and voltage to cause a first proportion of the chiral nematic material to exhibit a first optical state and a second proportion of the chiral nematic material to exhibit a second optical state, whereby the material will continuously reflect a selected intensity between a maximum and minimum that is proportional to the amount of the material in the first optical state.

2 Claims, 2 Drawing Sheets

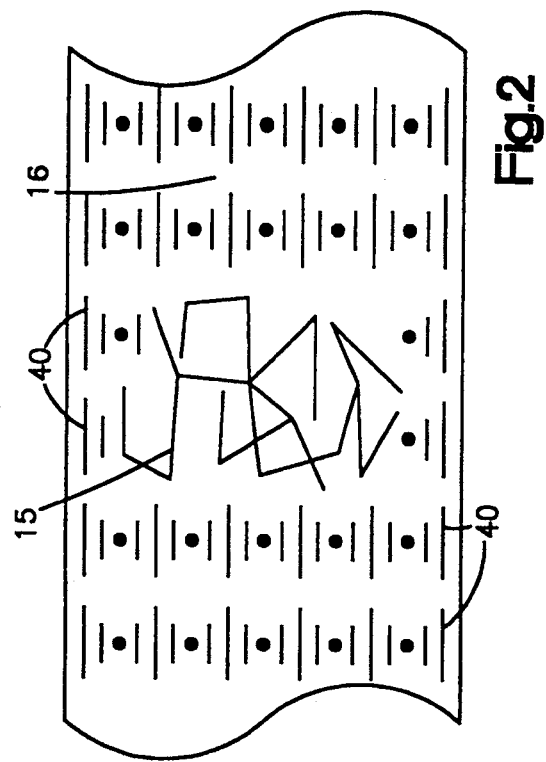
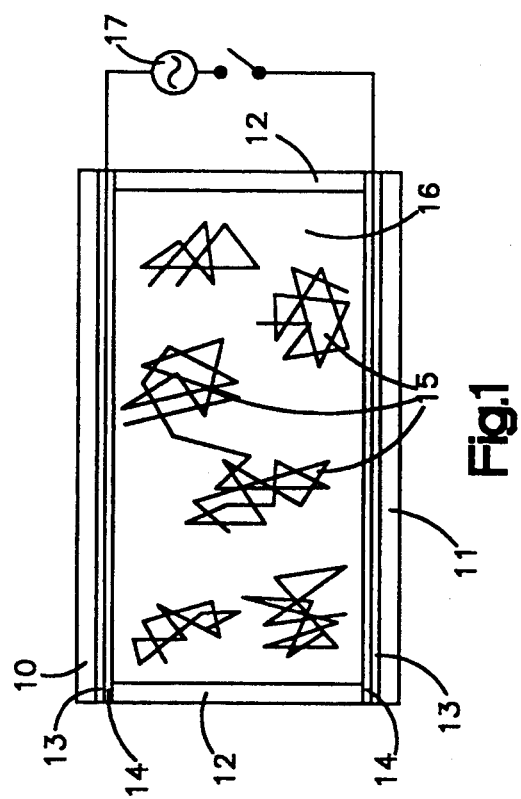
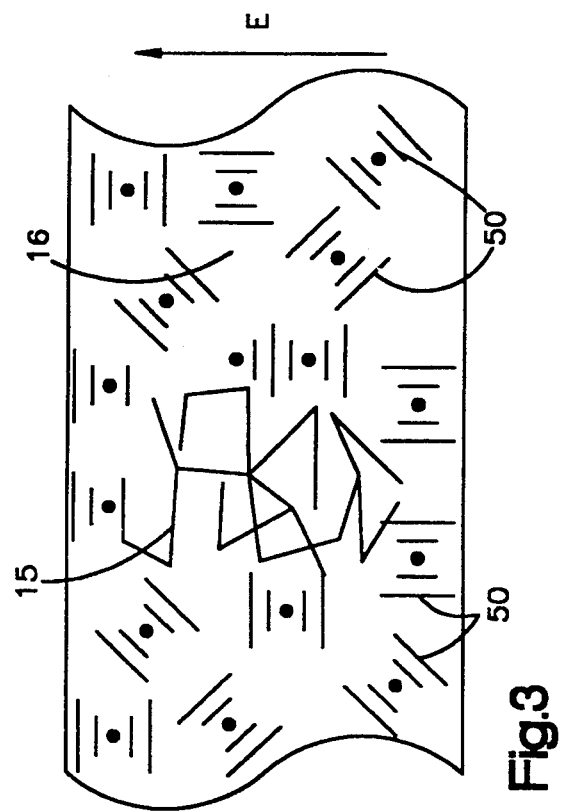

GREY SCALE LIQUID CRYSTAL MATERIAL

This application was made in part with Government support under cooperative agreement number DMR 89-20147 awarded by the National Science Foundation. The Government has certain rights in this invention.

RELATED APPLICATIONS

This application is a continuation in part of U.S. Ser. No. 07/694,840 filed May 2, 1991, now abandoned.

BACKGROUND OF THE INVENTION

The present invention relates generally to liquid crystalline light modulating devices, and more specifically to new phase-separated polymeric-liquid crystalline display materials and cells which exhibit multiple stable states after being subjected to a suitable electric field pulse. Depending upon the magnitude and shape of the electric field pulse the optical state of the material can be changed to a new stable state which reflects any desired intensity of colored light along a continuum of such states, thus providing a stable "grey scale."

In the above-noted patent application Ser. No. 07/694,840, now abandoned, incorporated herein by reference, a new liquid crystalline material is disclosed which comprises phase-separated polydomains of polymer network dispersed in liquid crystal. The liquid crystal is a chiral nematic having positive dielectric anisotropy and the polymer is present in an amount less than about 10% by weight based on the combined weight of liquid crystal and polymer. Under different field conditions the material exhibits different optical states. For example, the material can operate either in the mode of being light scattering in a field-OFF condition and clear in a field-ON condition or in the reverse mode of being clear in the field-OFF condition and light scattering in the field-ON condition. In both instances, the material is haze-free at all viewing angles when in the clear state. The material can also be prepared to exhibit bistability, where the application of a low electric field pulse results in a light scattering state and the application of a high electric field pulse, i.e., an electric field high enough to momentarily homeotropically align the liquid crystal directors, drives the material to a light reflecting state that can be any preselected color. The material is bistable because the light scattering and light reflecting states remain stable after the field is removed.

It has now been found that when electric field pulses of various magnitudes below that necessary to drive the material from the stable reflecting state to the stable scattering state will drive the material to intermediate states that are themselves stable. These multiple stable states indefinitely reflect colored light of an intensity between that reflected by the reflecting and scattering states. Thus, depending upon the magnitude of the electric field pulse the material exhibits stable grey scale reflectivity.

SUMMARY OF THE INVENTION

The invention employs a new electrically switchable polymer stabilized liquid crystal material which exhibits a unique combination of properties that afford significant advantages over preceding technology. Surprisingly, the material of the invention can be prepared so that it exhibits a stable grey scale, i.e., multiple optical states characterized by varying degrees of intensity of reflection, all of which are stable in the absence of an applied field. In between the reflecting and scattering states the material exhibits stable grey scale reflectance of the colored light depending upon the voltage of the electric field addressing pulse. In each case, the electric field pulse is preferably an AC pulse, and more preferably a square AC pulse, since a DC pulse will tend to cause ionic conduction and limit the life of the cell. If a high electric field is maintained, the material is transparent until the field is removed. When the field is turned off quickly, the material reforms to the light reflecting state and, when the field is turned off slowly, the material reforms to the light scattering state. Application of mechanical stress to the material can also be used to drive the material from the light scattering to the light reflecting state.

It is therefore an object of the invention to provide an improvement in a method of addressing a polymer stabilized chiral nematic liquid crystal material capable of being switched between a color reflecting state that reflects a maximum reference intensity, and a light scattering state exhibiting a minimum reference intensity. The improvement comprises applying A.C. voltage pulses of varying magnitude sufficient to achieve color reflectivity between said maximum and minimum, thereby producing stable grey scale reflectance from the material.

Selectively producing the continuous reflection of colored light of an intensity between that of the reflecting state and that of the scattering state comprises subjecting the material to an AC pulse. The material is a polymer stabilized chiral nematic liquid crystal material comprising phase-separated polydomains of polymer network dispersed in liquid crystal, the liquid crystal being a chiral nematic having positive dielectric anisotropy and the polymer being present in an amount less than about 10% by weight based on the combined weight of liquid crystal and polymer. Preferably the method is characterized by subjecting the material to an AC pulse of sufficient duration and voltage to cause a proportion of said chiral nematic material to exhibit a first optical state and the remaining proportion of the chiral nematic material to exhibit a second optical state that is different than the first state. In the preferred embodiment, the proportion of the material in the first optical state exhibits the planar texture and the remainder of the material in the second optical state exhibits the focal conic texture, the intensity of reflection being proportional to the amount of the material in the planar reflecting texture.

The polymer stabilized chiral nematic liquid crystalline light modulating material of the invention is incorporated in a cell having wall structure treated to align the liquid crystal molecules and any suitable addressing means for establishing a field through the material. The addressing means can be of any type, known in the art, such as an active matrix, a multiplexing circuit, electrodes, etc. is noted above, the new liquid crystalline light modulating material comprises phase-separated polydomains of polymer network dispersed in a chiral nematic liquid crystal having positive dielectric anisotropy. The polymer is present in an amount less than 10% by weight based on the combined weight of chiral liquid crystal and polymer. The liquid crystal molecules in the vicinity of the polydomains are preferentially oriented and are anchored by the polymer network so as to be less responsive to an applied field than the surrounding liquid crystal molecules whose orientation is strongly influenced by field conditions and the surface aligning effect of the cell walls. As a result, the new material can be made to exhibit different optical states under different field addressing conditions, i.e., light scattering, light reflecting, stable grey scale therebetween and light transmitting.

The monomeric material used to form the polymer networks is soluble with the chiral nematic liquid crystal and phase separates upon polymerization to form ordered polymer networks. Examples of useful monomers have at least two polymerizable double bonds so as to be crossolinkable, and include bisacrylates and the like. The chiral nematic liquid crystal is a mixture of nematic liquid crystal having positive dielectric anisotropy and chiral material in an amount sufficient to produce a desired pitch length.

The liquid crystalline light modulating material of the invention exhibits a stable, light reflecting colored state, a stable light scattering state and stable grey scale states therebetween, i.e., a continuum of stable states in which colored light is reflected from the display at an intensity level between that reflected by the reflecting and scattering states and which will remain there in the zero field condition. To this end, the chiral nematic liquid crystal has a pitch length in a preferred range of from about 0.25 to 0.44 microns effective to reflect circularly polarized colored light. The wavelength of the reflected light is given by the relation $\lambda = np$, where n is the average refractive index and p is the pitch length. Typical pitch lengths are 0.27 microns for blue color, 0.31 microns for green color and 0.40 microns for red color. Multistable color display materials contain from about 27 to 48% chiral material based on the combined weight of nematic liquid crystal and chiral material, and from about 1.0 to about 4.5% polymer based on the combined weight of the chiral nematic liquid crystal mixture and polymer. The ranges can vary, however, depending upon the chiral material, liquid crystal and the polymer which are used.

As alluded to above, the stable grey scale phenomenon exhibited by the polymer stabilized chiral nematic materials of the invention is characterized by the ability, of the material to reflect indefinitely any selected intensity of light between the intensity reflected by the reflecting state and that reflected by the scattering state. When the material is in the reflecting state the chiral material assumes a planar texture which reflects colored light at a maximum intensity for a given material, the color of the reflected light being determined by the pitch length of the chiral material. An AC pulse of an appropriate threshold voltage, typically in the range of about 4 to 5 volts per micrometer of thickness, will cause at least a portion of the material to change its optical state and the intensity of reflectivity to decrease. If the AC pulse is high enough, e.g., in the range of about 6 to 8 volts per micrometer of thickness, the optical state of the material will change completely to the scattering state in which the chiral material exhibits a focal conic texture which reflects light at a minimum intensity for a given material. In between the reflecting state, which for a given material can be considered to define the maximum intensity of reflectivity for that material, and the scattering state, which can be considered to define the minimum intensity of reflectivity, the intensity of reflectivity ranges along a grey scale, which is simply a continuum of intensity values between that exhibited by the reflecting and scattering states. By pulsing the material with an AC pulse of a voltage below that which will convert the material from the reflecting state to the scattering state, or visa versa, one obtains an intensity of reflectivity in this grey scale range.

While not wanting to be bound by theory, it has been observed that the intensity of reflectivity along the grey scale is approximately linearly proportional to the voltage of the pulse. By varying the voltage of the pulse the intensity of reflectivity of a given color can be varied proportionally. When the electric field is removed the material will reflect that intensity indefinitely. It is believed that pulses within this grey scale voltage range cause a proportion of the material to convert from the planar texture characteristic of the reflecting state, to the focal conic texture characteristic of the scattering state. Since both the planar texture of the reflecting state and the focal conic texture of the scattering state are stabilized by the polymer in the zero field condition, the grey scale intensities reflected by the display are also stable since the material in these optical states simply comprises a combination of both the stable planar texture and the stable focal conic texture. The intensity of reflectivity along the grey scale is proportional to the amount of chiral material switched from the planar texture to the focal conic texture, or vise versa, which is in turn proportional to the voltage of the AC pulse.

Many additional features, advantages and a fuller understanding of the invention will be had from the following detailed description of preferred embodiments and the accompanying drawings.

BRIEF DESCRIPTION OF THE DRAWINGS

FIG. 1 is a diagrammatic, cross-sectional view of a light modulating cell incorporating the polymer-liquid crystalline material of the invention.

FIG. 2 is a diagrammatic, fragmentary, enlarged cross-sectional view of the material when the liquid crystal is in the reflecting state having a twisted planar structure.

FIG. 3 is a diagrammatic, fragmentary, enlarged cross-sectional view of the material in the scattering state wherein the liquid crystal in proximity to the polydomains has a twisted planar structure, while the surrounding liquid crystal has a focal conic texture.

DETAILED DESCRIPTION OF THE INVENTION

Figure 4:
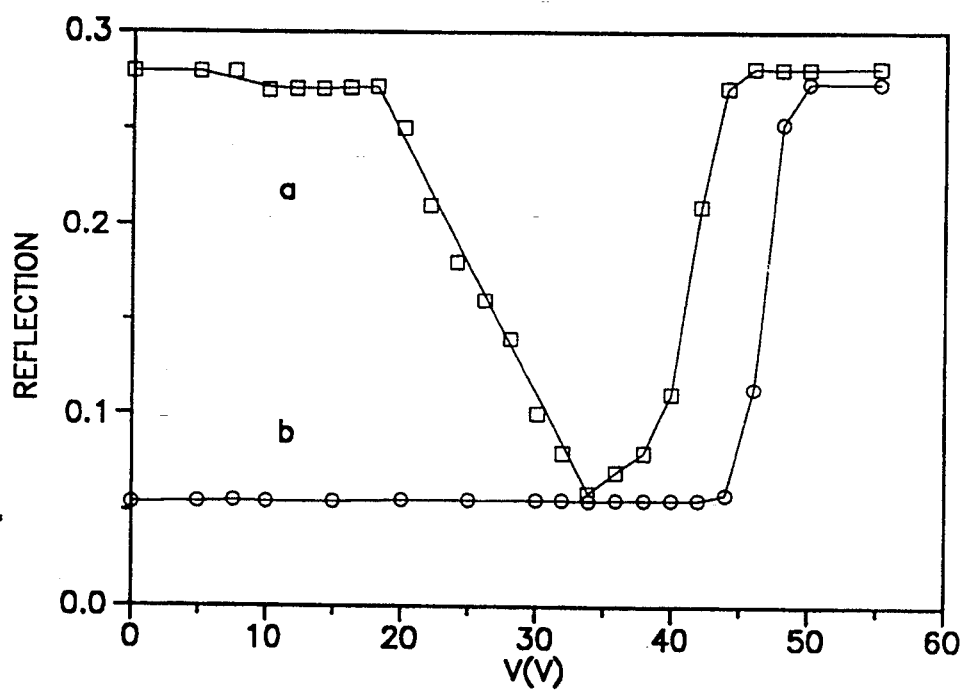
FIG. 4 is a plot of the dynamic response of a cell to AC pulses of varying voltages demonstrating grey scale reflection in the voltage range of about 20 and 34 volts.

The diagrammatically illustrated cell in FIG. 1 comprises glass plates 10, 11 which are sealed around their edges and separated by spacers 12. As shown, the glass plates 10, 11 are coated with indium-tin oxide or the like to form transparent electrodes 13. The electrodes 13 are provided with rubbed polyimide coatings 14 in order to affect homogeneous surface alignment of the liquid crystal directors.

The cell of FIG. 1 is filled with the polymer-stabilized liquid crystalline material of the invention. The liquid crystalline light modulating material is generally comprised of phase-separated polydomains 15 of polymer network dispersed in surrounding chiral nematic liquid crystal 16 having positive dielectric anisotropy. An AC voltage source 17 is shown connected to the electrodes 13 in order to switch the cell between different optical states by application of a voltage pulse.

It is to be understood that the form of the cell depicted in FIG. 1 has been chosen only for the purpose of describing a particular embodiment and function of the invention, and that the material of the invention can be addressed in various ways and incorporated in other types of cells. For example, instead of being addressed by externally activated electrodes, the material can be addressed by an active or passive matrix, a multiplexing scheme or other type of circuitry, all of which will be evident to those working in the art.

In accordance with the invention, the polydomains 15 are defined by what are believed to be complex cross-linked, ordered polymer networks which are phase separated from solution with the chiral nematic liquid crystal material. As indicated in FIG. 1, the domains 15 of polymer network appear in spaced areas rather than being uniformly connected throughout the liquid crystal 16. The chiral nematic liquid crystal in proximity to the polydomains 15 is preferentially oriented and the liquid crystal molecules are anchored by the polymer networks so as to be less responsive to an applied field than the surrounding liquid crystal. The liquid crystal surrounding the polydomains is responsive to field conditions, whereby the cell will exhibit different optical states under different field conditions.

If the polymer content is less than 10% by weight based on the combined weight of chiral nematic liquid crystal and polymer. In preferred composition, the polymer content ranges from about 1.0 to about 4.5% polymer. It is to be understood that the polymer content is subject to some variation inasmuch as what constitutes a desirable or undesirable appearance of the cell in its various optical states is a matter of subjective judgment. A particularly suitable polymer is Desolite 950-044 manufactured by DSM Desotech Inc.

In a preferred matter of preparing the cell shown in FIG. 1, the monomer, which preferably can be polymerized by UV radiation, is dissolved with the chiral nematic liquid crystal together with a small amount of photo-initiator. The solution is then introduced between the glass plates 10, 11 having the rubbed polyimide coatings 14. The solution is irradiated in situ with UV light to affect polymerization and concomitant phase separation of the polymer to form the polydomains 15. The radiation of the monomer-liquid crystal solution can take place either in the presence of an electric field effective to homeotropically align the liquid crystal directors or in zero field.

Multistable color display cells which scatter light in one state and reflect circularly polarized colored light in another state with stable grey scale reflection therebetween, and which also can be operated to exhibit optical transparency, are made using chiral nematic liquid crystal which has a pitch length effective to reflect light in the visible spectrum. Preferred materials have a pitch length ranging from about 0.25 to about 0.44 microns. Typical pitch lengths are 0.27 microns for blue color, 0.31 microns for green colors and 0.40 microns for red color. Multistable color display materials are typically prepared to contain from about 27 to about 48% chiral material based on the combined weight of nematic liquid crystal and chiral material; although, as in the case of previously described embodiments, the weight amount can vary depending upon the particular chiral material, nematic liquid crystal and polymer which are used.

FIG. 2 conceptually illustrates a single polydomain 15 of the multistable color display material of the invention in its light reflecting state. In this state, the chiral liquid crystal molecules 40 are oriented in a twisted planar structure parallel to the cell walls due to the surface alignment effect of the polyimide layers 14. Because of the twisted planar texture the material will reflect light, the color of which depends upon the particular pitch length. In this stable reflecting state, the material exhibits maximum reflectivity that constitutes a maximum reference intensity below which the grey scale intensities are observed.

The planar texture of the liquid crystal in the vicinities of the polymer domains 15 is stabilized by the polymer networks. The surrounding liquid crystal indicated by reference numeral 50 in FIG. 3, being less stabilized, tends to reform to the focal conic texture, i.e., helically twisted molecules having randomly oriented axes, when an AC voltage pulse is applied to the cell. As conceptually illustrated in FIG. 3, the multistable color display material is in its light scattering state. In this stable scattering state the material exhibits its minimum intensity of reflection (i.e., maximum scattering) which defines a minimum reference intensity, of reflectivity above which the grey scale intensities are observed.

If the pitch length of the polymer stabilized liquid crystal material is in the range to reflect visible light, both the light reflecting state of FIG. 2 and the light scattering state of FIG. 3, as well as the grey scale states therebetween, are stable in the absence of an electric field. If the multistable material is in the light reflecting state of FIG. 2 and a low electric field pulse is applied, for example, about 6 volts per micron, the material will be driven to the light scattering state of FIG. 3 and will remain in that state at zero field. If the multistable material is in the light scattering state of FIG. 3 and a higher electric field pulse sufficient to untwist the chiral molecules is applied, e.g., about 10 volts per micron of thickness, the liquid crystal molecules will reform to the light reflecting state of FIG. 2 at the end of the pulse and will remain in that condition. It is to be understood that the voltages per micron necessary to drive the material between optical states may vary depending on the composition of the material, but that the determination of necessary voltages is well within the skill in the art in view of the instant disclosure.

If the high electric field necessary to untwist the liquid crystal molecules is maintained, the liquid crystal directors will be homeotropically aligned so that the material is transparent. If the field is slowly removed, the liquid crystal orientation will reform to the light scattering state of FIG. 3. When the field is quickly removed, the orientation will reform to the light reflecting state of FIG. 2. The intensities of reflectivity reflected between the reflecting state of FIG. 2 and the scattering state of FIG. 3 are stable grey scale reflectivities. Of course, the intensity value of the reflecting and scattering states may vary as the composition of the material varies, but the grey scale is defined by the range of intensities therebetween.

At voltages less than that which will transform the material from the reflecting state of FIG. 2 to the scattering state of FIG. 3, grey scale states which are themselves stable at zero field are obtained. The reflection from the material in these grey scale states is stable because a proportion of the material is in the planer reflecting texture of FIG. 2 and a proportion of the material is in the focal conic scattering texture of FIG. 3, both of which are stabilized by the polymer in the absence of a field.

Thus, for example, if the material is in the reflecting state of FIG. 2 and an electric field pulse is applied having a voltage insufficient to drive all of the liquid crystal 16 surrounding the polydomains 15 into the focal conic texture shown at 50 in FIG. 3, i.e., insufficient to drive the material completely to the scattering state, the material will reflect colored light of an intensity that is proportional to the amount of material that remains in the planar reflecting texture. The reflectivity will thus be lower than that reflected from the material when all of the chiral material is in the planar reflecting texture, but still higher than when switched completely to the focal conic scattering texture. As the voltage of the electric field pulse is increased, more of the chiral material is switched from the planar reflecting texture to the scattering focal conic texture and the reflectivity decreases further until the voltage of the pulse is increased to the point where the material is completely switched to the scattering state. If the voltage of the pulse is increased still further, the intensity of reflection begins to increase again until the magnitude of the pulse is sufficient to untwist the chiral molecules so that they will again reform to the planar light reflecting texture when the pulse is removed and the material is again in the light reflecting state of FIG. 2.

If the material is in the focal conic scattering state of FIG. 3, an applied electric field pulse will have a negligible effect on the reflectivity of the cell until it reaches a magnitude sufficient to untwist the chiral material, whereby it will reform to the light reflecting state of FIG. 2, as described above, when the field is removed. The grey scale response of a cell as described above is illustrated in FIG. 4 which shows the response of the material prepared in Example 1 to varying pulse voltages.

EXAMPLE 1

A multistable grey scale display cell was made from a polymer stabilized chiral nematic liquid crystalline material of the following components:

160.7 mg—CB15 cholesteric liquid crystal, BDH Chemicals 160.7 mg—CE2 cholesteric liquid crystal, BDH Chemicals 488.8 mg—E31 nematic liquid crystal, BDH Chemicals 8.0 mg—BAB (4,4'-bisacryloylbiphenyl), lab synthesized monomer 3.0 mg—BME (benzoinmethyl ether), Polyscience Co., photo-initiator 2.2 mg—R4, dichroic dye A mixture of the liquid crystal and monomer was sandwiched between two glass plates with ITO electrodes. The glass plates were polyimide coated and buffed for homogeneous alignment of the liquid crystal. The back plate was painted black and separated from the front plate by 5 $\mu$m glass fibers. In the reflecting state the cell reflected green color. In the scattering state the cell was black. The filled cell was irradiated with U.V. light for thirty minutes to polymerize the monomer and cause phase separation of the polymer into polydomains of polymer network throughout the chiral nematic liquid crystal.

The reflectivity of the cell in response to AC pulse of varying voltages was measured. In the measurement, square AC pulses of width of 10 milliseconds (ms) were used. For this material an applied pulse of 34 V switched the cell completely into the scattering state, independent of whether it was in the reflecting state or the scattering state before the pulse. Minimum reflection is observed here. An applied pulse of 50 V switched the cell into the reflecting state independent of whether the cell was in the scattering or reflecting state prior to the pulse. Maximum reflection is observed here. The transformation from the reflecting to the scattering state was near 0.5 ms. The transformation from the scattering to the reflecting state was near 300 ms.

The grey scale response of the cell in response to pulses of varying voltage is seen in FIG. 4. Here the voltage of the pulse was varied and the reflection of the cell was measured one second after the pulse. Curve A is the response of the cell when the material is in the reflecting state prior to each pulse. Prior to each pulse plotted on curve A the material was subjected to a high AC pulse of about 50 V to ensure that it was completely in the reflecting state prior to the pulse. When the voltage of the pulse is below 20 V, the reflection of the cell is not affected. When the voltage of the pulse is between 20 V and 34 V, the later being the voltage necessary to switch the cell to the scattering state, the reflectivity of the cell decreases approximately linearly as the voltage of the pulse is increased. Grey scale reflectivity is observed in this voltage range. In each case the material continued to reflect after the pulse was removed. When the voltage of the pulse was increased above 34 V, the reflectivity of the cell increased until the reflectivity reached its original value, i.e., that of the reflecting state, above 46 V. Curve B is the response of the cell when the material was initially in the scattering state prior to the AC pulse. Here the reflectivity of the cell remains unchanged for an AC pulse below 40 V. Above 40 V the material switched to the reflecting state.

Further examples of materials prepared according to the invention and suitable for use in displays capable of achieving stable grey scale reflectivity are shown in the following non-limiting examples.

EXAMPLE 2

A color display cell reflecting red circularly polarized light in the reflecting state was prepared using a solution of chiral nematic liquid crystal containing 29.8% by weight chiral material based on the combined weight of chiral material and nematic liquid crystal, and 2.7% by weight of a cross-linking monomer based on the combined weight of monomer and chiral liquid crystal. The chiral liquid crystal had a pitch length of 0.41 microns.

The polymerizable solution consisted of:

67.8 mg. of E-31LV nematic liquid crystal;

14.0 mg. of 4"-(2-methylbutylphenyl)-4'-(2-methylbutyl)-4-bipheny carboxylate (chiral material);

14.8 mg. of 4-cyano-4'-(2-methyl) butylbiphenyl (chiral material);

2.7 mg. of 4,4'-bisacryloyl biphenyl (monomer); and 1.0 mg. of benzoin methyl ether (photo-initiator).

A cell having two glass plates sealed at the edges and separated by 8 micron thick Mylar spacers was filled with the polymerizable solution. The glass plates were coated with indium-tin oxide to provide transparent electrodes. The electrodes were coated with polyimide and buffed to affect homogeneous surface alignment of the liquid crystal.

The filled cell was irradiated with U.V. light for thirty minutes to polymerize the monomer and cause phase separation of the polymer into polydomains of polymer network throughout the chiral nematic liquid crystal.

EXAMPLE 3

A cell having a blue reflecting state was prepared using a solution of chiral nematic liquid crystal containing 45.3% by weight chiral material based on the weight of chiral material and nematic liquid crystal, and 1.5% by weight of a cross-linking monomer based on the combined weight of monomer and chiral nematic liquid crystal. The chiral nematic liquid crystal had a pitch length of about 0.27 microns, reflecting blue circularly polarized light in the reflecting state.

The polymerizable solution consisted of:
132.6 mg. of E-31LV nematic liquid crystal;
50.0 mg. of 4″-(2-methylbutylphenyl)-4′-(2-methylbutyl)-4-biphenyl carboxylate (chiral material);
59.7 mg. of 4-cyano-4′-(2-methyl) butylbiphenyl (chiral material);
3.7 mg. of 4,4′-bisacryloyl biphenyl (monomer); and
1.0 mg. of benzoin methyl ether (photo-initiator).

The cell was prepared as in Example 2. The cell was in a blue reflecting state after the removal of the high voltage pulse.

EXAMPLE 4

A cell having a green reflecting state was prepared using a solution of chiral nematic liquid crystal containing 39.1% by weight chiral material based on the weight of chiral material and nematic liquid crystal and 2.0% by weight of a cross-linking monomer based on the combined weight of chiral nematic liquid crystal and monomer. The chiral liquid crystal had a pitch length of about 0.31 microns, reflecting green circularly polarized light.

The polymerizable solution consisted of:
85.6 mg. of E-31LV nematic liquid crystal;
27.0 mg. of 4″-(2-methylbutylphenyl)-4′-(2-methylbutyl)-4-biphenyl carboxylate (chiral material);
28.0 mg. of 4-cyano-4′-(2-methyl)butylbiphenyl (chiral material);
2.9 mg. of 4,4′-bisacryloyl biphenyl (monomer); and
1.0 mg. of benzoin methyl ether (photo-initiator).

The cell was prepared as in the preceding examples. The cell was in a green reflecting state after the removal of the high voltage pulse.

EXAMPLE 5

A cell having a red reflecting state was prepared using a solution of chiral nematic liquid crystal containing 30.0% by weight chiral material based on the combined weight of chiral material and nematic liquid crystal and 1.9% by weight a cross-linking monomer based on the combined weight of chiral nematic liquid crystal and monomer. The chiral liquid crystal has a pitch length of about 0.41 microns.

The polymerizable solution consisted of:
80.0 mg. of E-31LV nematic liquid crystal;
16.7 mg. of 4″-(2-methylbutylphenyl)-4′-(2-methylbutyl)-4-biphenyl carboxylate (chiral material);
17.5 mg. of 4-cyano-4′-(2-methyl) butylbiphenyl (chiral material);
22 mg. of 4,4′-bisacryloyl biphenyl (monomer); and
1.0 mg. of benzoin methyl ether (photo-initiator).

The sample cell was prepared as in the preceding examples. The cell was a red reflecting state after removal of the high voltage pulse.

EXAMPLE 6

A green reflecting cell with a greater degree of contrast between the reflecting state and scattering state was prepared using a solution of chiral nematic liquid crystal containing 39.1% by weight chiral material based on the combined weight of chiral material and nematic liquid crystal and 2.0% by weight of a cross-linking monomer based on the combined weight of monomer and chiral nematic liquid crystal. The chiral nematic liquid crystal had a pitch length of about 0.31 microns, reflecting green circularly polarized light.

The polymerizable solution consisted of:
85.6 mg. of E-31LV nematic liquid crystal;
27.0 mg. of 4″-(2-methylbutylphenyl)-4′-(2-methylbutyl)-4-biphenyl carboxylate (chiral material);
28.0 mg. of 4-cyano-4′-(2-methyl) butylbiphenyl (chiral material);
2.7 mg. of 4,4′-bisacryloyl biphenyl (monomer); and
1.0 mg. of benzoin methyl ether (photo-initiator).

A cell having two glass plates sealed at the edges and separated be 8 micron thick Mylar spacers was filled with the polymerizable solution. The glass plates were coated with indium-tin oxide to provide transparent electrodes. The electrodes were coated with polyimide and buffed to affect homogeneous surface alignment of the liquid crystal.

The filled cell was irradiated with U.V. light to polymerize the monomer and cause phase separation of the polymer into polydomains of polymer networks throughout the chiral liquid crystal. While the cell was being irradiated, an AC electric voltage was applied to cause homeotropic alignment of the liquid crystal.

The state of the cell was controlled by the voltage of an electric pulse. When a high AC voltage ($V_{rms} = 104$ V) was applied, the cell was optically clear and transparent to all angles of incident light. When the high AC voltage wads removed, the sample was in the reflecting state and because of the pitch of the chiral liquid crystal, the color of the cell was green. When an AC voltage ($50\ V \leq V_{rms} \leq 85\ V$) was applied the cell switched to the light scattering state and after removal of the low voltage field the cell remained in the light scattering state. Both the reflecting and scattering states were observed to be stable states. This cell appeared to have better contrast between the reflecting and scattering states than the cell prepared in the preceding examples. This should result in a broader grey scale obtainable by this material.

Many modifications and variations of the invention will be apparent to those skilled in the art in light of the foregoing detailed disclosure. Therefore, within the scope of the appended claims, the invention can be practiced otherwise than as specifically shown and described.

What is claimed is:

1. A light modulating device comprising liquid crystalline light modulating material comprising phase-separated polydomains of polymer network dispersed in liquid crystal, said liquid crystal being a chiral nematic having positive dielectric anisotropy and said polymer being present in an amount less than about 10% by weight based on the combined weight of liquid crystal and polymer, wherein a proportion of said material is in a first optical state and the remainder of said material is in a second optical state, cell wall structure treated to align the liquid crystal molecules by application of a coating upon the cell wall structure, and means for establishing an electrical field through said material, said means being suitable for providing an AC pulse of sufficient voltage and duration to change the proportion of said material in said first optical state, whereby the intensity of light reflected may be selectively adjusted.

2. The device according to claim 1 wherein the proportion of material in said first optical state exhibits a planar texture and the proportion of material in said second optical state exhibits a focal conic texture.

* * * * *